Oct. 23, 1945.  H. E. ROSE  2,387,531
AUTOMATIC PUMP SELECTOR VALVE
Filed March 22, 1943  2 Sheets-Sheet 1

INVENTOR
HOWARD EDWARDS ROSE
BY
ATTORNEY

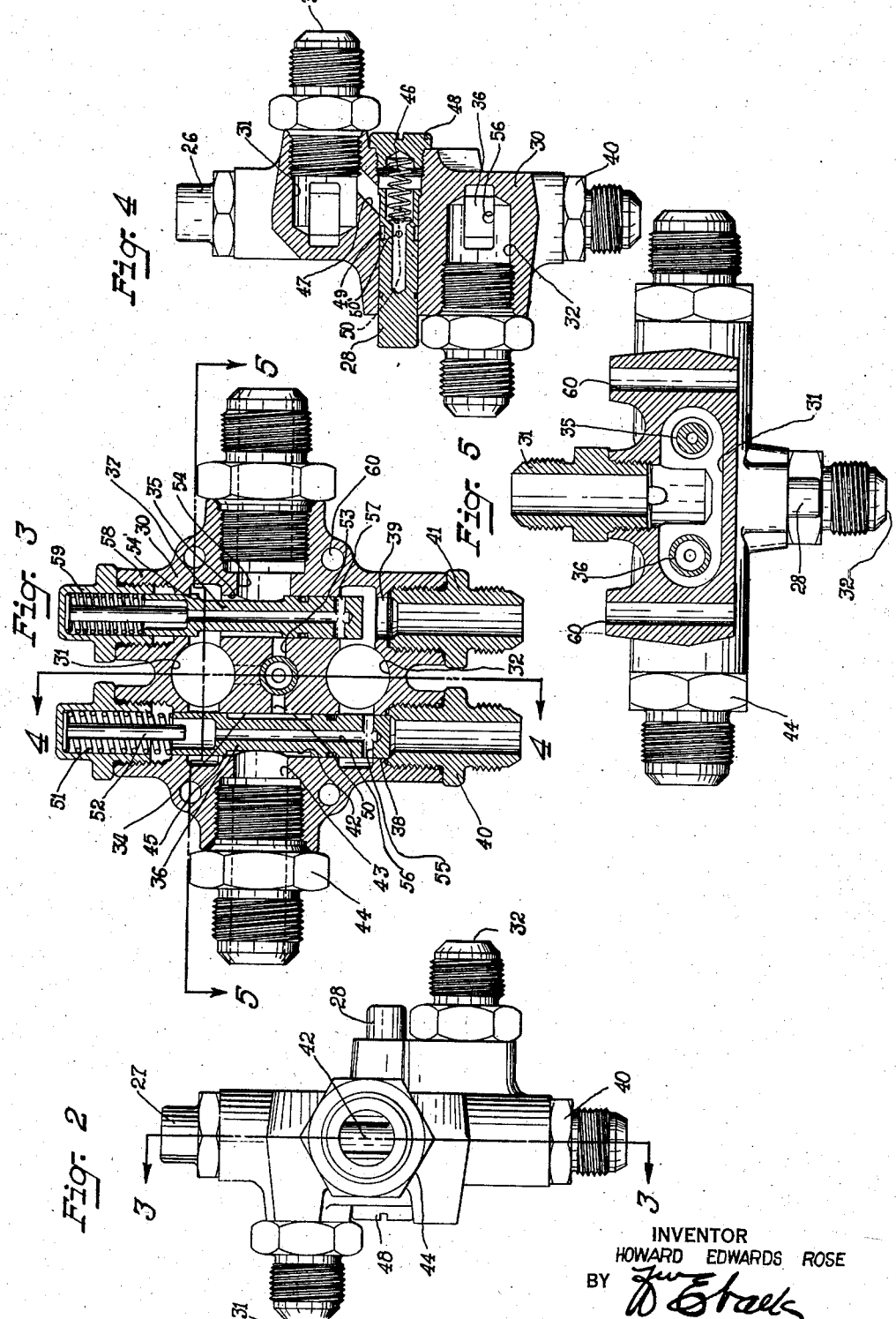
Oct. 23, 1945.  H. E. ROSE  2,387,531
AUTOMATIC PUMP SELECTOR VALVE
Filed March 22, 1943  2 Sheets-Sheet 2
INVENTOR
HOWARD EDWARDS ROSE
BY
ATTORNEY Patented Oct. 23, 1945

2,387,531

UNITED STATES PATENT OFFICE 2,387,531

AUTOMATIC PUMP SELECTOR VALVE

Howard Edwards Rose, Normandy, Mo., assignor to Curtiss-Wright Corporation, a corporation of Delaware Application March 22, 1943, Serial No. 480,104

11 Claims. (Cl. 103—40)

This invention relates to multiple pump hydraulic systems for use in airplanes and more particularly to pump selector valves therefor.

Heretofore, the pump selector valves in hydraulic systems for airplanes have been operable only at the will of the operator and have not been of such design and so arranged in the system as to prevent leakage upon destruction of the pump supply from the reservoir. Check valves have been used on the pressure side of the pumps but these valves were only to retain the fluid within the fluid actuating means in order to retain the landing gear, or other movable part, in its adjusted position independently of the pressure supply when this pressure supply had failed due to some destruction to the pump or the oil lines. In such airplanes where the pumps are located outwardly of the center of the airplane, there are numerous lines extending to and from the fuselage where the oil reservoir is usually located, and these lines which are vulnerable to gun fire often become damaged. When a pressure line is damaged, oil may continue to be pumped from the reservoir through the suction line and the oil supply is thus depleted in short order should the operator fail to operate the manual selector valve to throw the same over to the other pump. During this time the hydraulic pressure of the system would go completely to zero until the operator had moved the selector valve to take oil from the other pump. With complete failure of pressure and due to the time delay in bringing up further pressure, many of the vital parts of the aircraft would become dormant just long enough as to perhaps cause the airplane to fail before its mission has been accomplished.

It is, therefore, an object of the present invention to provide a selector valve for a hydraulic system for use in airplanes wherein a plurality of pump sources run in operation at all times and wherein upon failure of one of these pump sources, both the oil supply and pressure lines of the pump source will be automatically closed off independently of the operator and continued operation of the hydraulic system will ensue with the other pump source whereupon the auxiliary will still be operated, the failed pump source being thereby automatically isolated.

It is another object of the invention to provide in a valve arrangement a check valve which will close both suction and pressure lines of the pump source simultaneously and automatically.

It is still another object of the invention to provide in a check valve arrangement of a type having a plurality of pressure sources, means wherein pressure from the remaining pump source can be caused to act upon the check valve controlling the failed pump source to insure quick and positive action of the same.

According to the present invention, there has been provided an automatic selector valve adapted to be disposed in a hydraulic system for airplanes and arranged to receive fluid from the main reservoir, and which after this fluid has been acted upon by the pump sources to build up pressure, delivers this fluid under pressure to a fluid actuator for part of the hydraulic system. In the valve there is a plurality of check valves, one for each of the pump sources which feeds the fluid under pressure to the valve. This check valve is so arranged that it is operated by pressure from the pump source and when released, due to failure of pressure, it will not only close off the pressure line from the particular pump source, but it will also close off the suction line to that same pump source whereby the complete source is automatically closed off or isolated from the reservoir and from the hydraulic system. With the other pump source still operating, pressure is still had by the system though to work the fluid actuator at a slower rate. Each check valve has a passage-way in the same to permit fluid to pass from the remaining pump source to the opposite side of the check valve whereby quick and positive action of the check valve for the failed pump source will be insured. In order that the pump sources can be primed upon starting the system, a small plunger is provided which, on being manually depressed, will cause fluid to bypass the valve and flow freely from the reservoir to the suction side of the pump.

For other objects and for a better understanding of the invention, reference may be had to the following detail description taken in connection with the accompanying drawings, in which Fig. 1 is a diagrammatic view showing the location of the automatic selector valve in the hydraulic system of the airplane.

Fig. 2 is an end view, in elevation, of the selector valve embodying the features of the present invention.

Fig. 3 is a cross sectional view taken along the line 3—3 of Fig. 2 and looking in the direction of the arrows thereof.

Fig. 4 is another cross sectional view illustrating more clearly the operation of the priming plunger and taken generally along the line 4—4 of Fig. 3.

Fig. 5 is still another cross sectional view taken through another plane of the selector valve, such as along the line 5—5 of Fig. 3 and looking in the direction of the arrows thereof.

Figure 1:
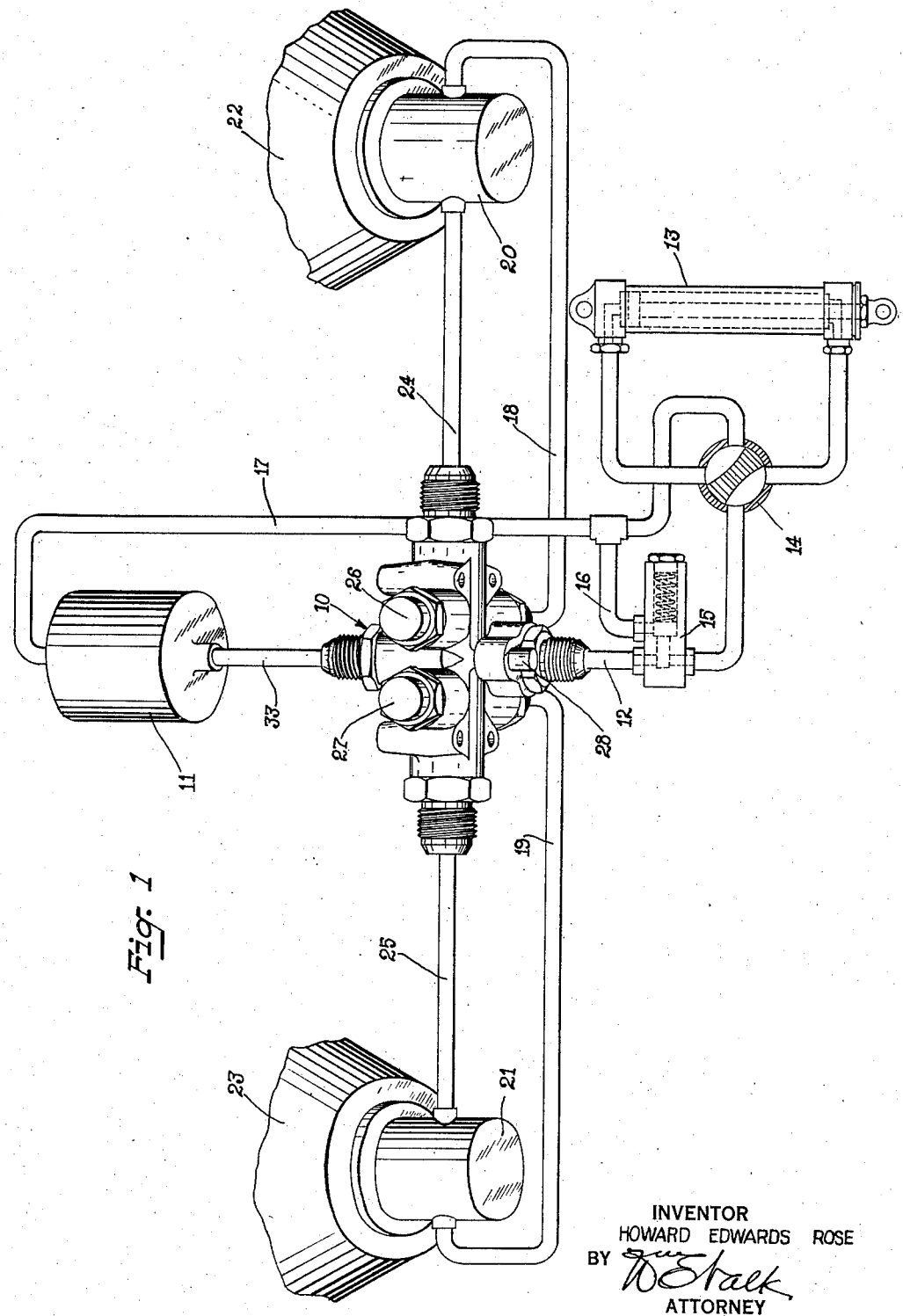

Referring now particularly to Fig. 1, there is shown the valve 10 embodying the features of the present invention disposed in a system to receive fluid from a reservoir 11 and to deliver fluid to a conduit 12 to effect actuation of a fluid motor 13, the fluid entering the actuator in a manner depending upon the adjustment of a four-way control valve 14. With the fluid motor 13 having been actuated, pressure will be built up to such a degree that it may bypass the fluid actuator through a bypass valve 15 and return to the reservoir 11 through a conduit 16 which delivers the fluid to a main return pipe 17. The main return pipe 17 is also connected at its remote end to the control valve 14 to receive fluid returned from the fluid motor 13.

Fed into this valve 10 by means of pressure lines 18 and 19, is fluid under pressure from pump sources 20 and 21 respectively. These pumps on a multiple engine airplane are located externally of the fuselage of the airplane and are adapted to be driven by engines 22 and 23 respectively located nearby. These pump sources 20 and 21 receive fluid from the same valve by means of suction lines 24 and 25 respectively. The suction and pressure lines of each pump source are arranged to be controlled by a single check valve within the main selector valve 10. The check valve for the pump 20 is located in the portion 26 of the main valve 10 while the check valve for the pump source 21 is located in the portion 27 of the main valve 10. A priming plunger 28 is accessible from the outside of the valve 10 and so connected within the valve as to effect priming of the suction lines 24 and 25.

Referring now more particularly to the remaining figures, a detail description will now be made of the valve 10. This valve 10 includes a valve housing 30 having a main inlet opening 31 and a main outlet opening 32. Fluid is received from the reservoir 11 through conduit 33 and is ever present in the main inlet opening 31. Straddling these two openings 31 and 32 are openings 34 and 35 which connect the inlet and outlet openings 31 and 32 together, Fig. 3. These openings 34 and 35 are so arranged as to receive respectively check valves 36 and 37 which totally fill the opening and at all times tend to prevent the fluid in the inlet opening 31 from passing directly to the outlet opening 32. These openings 34 and 35 are so provided as to simplify the construction of the housing structure. At the lower end of the valve housing 30 there are provided valve openings 38 and 39. When the check valves are lowered, they are retained in the openings 38 and 39 by thimble elements 40 and 41 threadingly retained within the housing in alignment with the respective check valves.

These check valves each have a narrowed portion 42, which, when the valve is turned against the thimble element, is centered over an opening 43. The opening 43 is connected to the pump source 21 by means of a thimble element 44 threadingly engaged with the housing 30 and to which a conduit can be attached. The openings 38 and 43 of the housing are so arranged with respect to each other that the fluid coming from the main inlet opening 31 will be delivered to the openings 43 and returned under pressure from the pump source 21 to the main outlet opening 32 from the opening 38.

At certain times the pump may need to be primed by fluid from the main inlet opening 31. Since there is a shoulder portion 45 which closes off the inlet opening from the opening 43 at such time as the check valve 36 is down, fluid must be obtained by some passageway other than through opening 34. Hence, there is provided a priming plunger 28 adapted to be depressed against the action of a spring 46 so as to open a port 47 which communicates with the inlet opening 31. As this plunger is depressed, the same will move until it is stopped by a retaining screw 48 so as to put into registry with the port 47 a circular recess 49 on the plunger, whereby fluid will pass from the port 47, to an opening 50 and thence to a recess in opening 34 provided by the narrowed portion 42 of a check valve. The plunger 28 has a hole 50' which prevents accumulation of fluid in back of the plunger. In this way sufficient fluid is allowed to pass until the pump 21 starts its pumping action to deliver the fluid under pressure at a sufficient rate through the conduit 19 as to act with sufficient pressure upon the bottom of the check valve to cause the same to be lifted from its opening 38 against the action of a spring 51 and until it may abut a stop 52. When this has taken place, the valve will have taken a position as shown at the right hand side of Fig. 3. Fluid under pressure will be allowed to flow freely to the outlet opening 32 of the main housing 30 to be supplied to the hydraulic system by way of the conduit 12. While this description has been limited to the operation of but one of the check valve elements, it should be understood that it may well apply to the check valve arrangement at the opposite side of the arrangement. The plunger 28 is also adapted to operate in a similar manner to supply fluid by way of a passage 53 to an outlet opening 54 at the opposite side of the valve which communicates with the suction line 24 for feeding fluid to the pump 20.

When the system is in operation, both of the pumps 21 and 22 will be supplying fluid under pressure to the outlet opening 32. Both of the check valves will be in the raised position as shown at the right side of Fig. 3. Fluid will thus be passing the openings 38 and 39. The fluid is received through the suction lines 24 and 25 from the opening 31 by passing through openings 34 and 35 provided by the narrowed portions 42 of the check valves when the valves are lifted to disengage closing portions 45 and 54' from the walls of the openings.

Each check valve is provided with a transverse opening 55 in its lower end and which is in communication with a vertically extending passageway 56 which leads to the outer side of the check valve. When both of the pumps are operating and the check valve is retained in its open position, the transverse opening 55 may be in the position as indicated at 57 in Fig. 3. Fluid is thus normally permitted to flow upwardly through the vertical opening 56 to the upper side of the valve at all times, since the stop pins 52 prevent the valves from rising far enough to close off fully the transverse ducts 55. Upon failure of one pump source the check valve which is normally held open by the flow of fluid from said source is allowed to drop, the fluid pressure from the remaining pump source acting through the opening 55 and passageway 56 to the upper side of the valve so as to apply pressure thereon in order that quick and positive closing of the opening 38 or 39, whichever the case may be, will be insured. In other words each valve will remain open only so long as there is a current of fluid acting against its end face. When there is an interruption in such current against either valve, the latter will close automatically, being urged toward and being held on its seat not only by the action of the spring 51 but also by the pressure created by the remaining operative pump.

The valve housing 30 for the purpose of retaining the springs 51, has a threaded cup shaped portion 58 into which is threaded an inverted closing cup 59 which houses the spring 51 and the stop 52. In order to provide means for the connection of the housing 30 to some part of the airplane structure, there are provided bolt openings 60.

It should now be apparent that there has now been provided a pump selector valve for hydraulic systems in airplanes which operates automatically to isolate any pump source which has failed. With one of the pump sources having failed, the system is still being provided with fluid pressure from the remaining pump source. Also, while the arrangement has been described with reference to use with hydraulic actuators it should be apparent that it could be equally well used in engine oil supply or engine cooling systems.

While various changes may be made in the detail construction, it shall be understood that such changes shall be made within the spirit and scope of the present invention as defined by the appended claims.

What is claimed is:

1. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a valve for isolating one of said pumps in the event of failure of pressure in the outlet line of said pump, and means responsive to the pressure developed by another of said pumps for effecting a quick and positive action of said valve and for holding the latter closed.

2. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, and a plurality of valves, each of said valves being adapted to isolate one of said pumps in the event of failure of the pressure in the outlet line of said pump and being biased to a closed position by the pressure developed by another of said pumps.

3. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a valve, and resilient means for normally biasing said valve to a closed position but permitting said valve to open and remain open in response to the pressure developed by one of said pumps, said valve closing automatically to isolate said pump in the event of failure of pressure in the outlet line of said pump and in so doing being responsive to said resilient means and to the pressure developed by another of said pumps.

4. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, and a plurality of valves, resilient means for normally biasing said valves to closed positions but permitting said valves to open and to remain open in response to the pressure developed by said pumps, each of said valves closing automatically to isolate one of said pumps in the event of failure of the pressure in the outlet line of said pump and in so doing being responsive to said resilient means and to the pressure developed by another of said pumps.

5. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a check valve, and resilient means for normally biasing said valve to cut off communication between the inlet and outlet lines of one of said pumps and said inlet and outlet chambers and permitting said valve to open in response to the pressure developed in said outlet line by said pump, said valve, in the event of the failure of pressure in the outlet line of said pump, being closed by the conjoint action of said resilient means and the pressure developed by another of said pumps.

6. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a plurality of valves, one for isolating each of said pumps in the event of failure of pressure in the outlet line of said pump, means for normally biasing said valves to closed positions, and means for by-passing fluid from said inlet chamber around said valves when the latter are closed to thereby prime and initiate the operation of said pumps.

7. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a check valve, resilient means normally biasing said valve to cut off communication between the inlet and outlet lines of one of said pumps and said inlet and outlet chambers and permitting said valve to open and to remain open in response to the pressure developed in the outlet line of said pump, said valve, in the event of the failure of pressure in the outlet line of said pump, being closed by the conjoint action of said resilient means and the pressure developed by another of said pumps, and means for by-passing fluid from said inlet chamber around said valve, when the latter is closed, to the inlet line of said first mentioned pump to thereby prime and initiate the operation of said pump.

8. In a fluid pressure system, a fluid reservoir, a valve mechanism having inlet and outlet chambers, the former being connected to said reservoir, a plurality of pumps, each having an inlet line which communicates with said inlet chamber and an outlet line which communicates with said outlet chamber, a plurality of check valves, each of said valves isolating one of said pumps in the event of failure of the pressure in the outlet line of said pump, bores in which said valves are movable to open and closed positions, each of said bores communicating with one of said inlet lines, a passage connecting said inlet chamber and said bores, whereby to enable fluid from said inlet chamber to be by-passed around said valves, when the latter are closed, to said inlet lines to prime and thereby initiate the operation of said pumps, and a normally closed valve in said passage which may be opened at will.

9. A fluid flow control device including: a housing formed with a plurality of valve bores each of which is provided with an inlet port for fluid under pressure and an outlet port, the housing also being formed with a fluid inlet chamber having fluid supply means, a plurality of discharge ports opening one to each of said bores from said inlet chamber, and a fluid outlet chamber having fluid outlet means in communication through each of said bores with the respective inlet ports for fluid under pressure; a plurality of valve elements disposed one in each of said bores each of said valve elements being constructed and arranged for positionment simultaneously to open or close said inlet and discharge ports of an associated bore in controlling fluid flow, said valve elements also being so constructed and arranged as to preclude fluid flow through the bores between the associated discharge port and said outlet chamber; and resilient means for each of said plurality of valve elements, each of said means acting automatically to bias its associated valve elements to port closing position upon cessation of fluid flow through the said fluid inlet port associated therewith.

10. A fluid flow control device including: a housing formed with a plurality of valve bores each of which is closed at one end and is provided with an inlet port for fluid under pressure and an outlet port, the housing also being formed with a fluid inlet chamber having fluid supply means a plurality of discharge ports opening one to each of said bores from said inlet chamber, and a fluid outlet chamber in communication through each of said bores with the respective inlet ports for fluid under pressure and having outlet means; and a plurality of valve elements disposed one in each of said bores each of said valve elements being constructed and arranged for movement toward or away from the closed end of its bore simultaneously to open or close said inlet and discharge ports of an associated bore respectively in controlling fluid flow but to preclude fluid flow through the bore between said inlet and discharge ports, each of said valve elements being formed with a fluid passage which places the closed end of its said valve bore at all times in fluid communication with said fluid outlet chamber whereby, upon cessation of fluid flow through one of said inlet ports, the pressure which exists in said outlet chamber as a consequence of others of said valve elements remaining in port open position may act through said fluid passage and the closed valve bore upon said valve element controlling said one of said inlet ports to bias it to a closed position.

11. A fluid flow control device including: a housing formed with a fluid inlet chamber and a fluid outlet chamber, the housing also being formed to provide parallel fluid discharge paths leading from said fluid inlet chamber and corresponding parallel fluid return paths leading to said fluid outlet chamber; fluid flow control valve elements operably positioned in said housing, each of said valve elements being constructed and arranged simultaneously to open or close a discharge and a corresponding return path for separate ones of said parallel fluid paths, each of said valve elements also being normally balanced when each thereof is positioned to permit fluid flow in its respective path; and resilient means associated with each of said valve elements for biasing the same to cut-off flow from said fluid inlet chamber in one of said parallel discharge paths and to cut-off flow to said fluid outlet chamber upon stoppage of the fluid flow in the corresponding one of said parallel fluid return paths.

HOWARD EDWARDS ROSE.